(12) United States Patent
Flowers et al.

(10) Patent No.: US 9,787,713 B2
(45) Date of Patent: *Oct. 10, 2017

(54) SYSTEM AND METHOD FOR DETECTING A COMPROMISED COMPUTING SYSTEM

(71) Applicant: EvengX, LLC, San Francisco, CA (US)

(72) Inventors: John S. Flowers, San Francisco, CA (US); Ridgely C. Evers, Healdsburg, CA (US)

(73) Assignee: EVENGX, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,957

(22) Filed: Apr. 24, 2016

(65) Prior Publication Data
US 2016/0315951 A1   Oct. 27, 2016

Related U.S. Application Data

(63) Continuation of application No. 14/490,543, filed on Sep. 18, 2014, now Pat. No. 9,350,707, which is a (Continued)

(51) Int. Cl.
*G06F 15/173* (2006.01)
*H04L 29/06* (2006.01)
(Continued)

(52) U.S. Cl.
CPC ......... *H04L 63/145* (2013.01); *G06N 99/005* (2013.01); *H04L 29/06095* (2013.01);
(Continued)

(58) Field of Classification Search
CPC ........... H04L 29/06931; H04L 63/1466; H04L 29/06095
See application file for complete search history.

(56) References Cited

U.S. PATENT DOCUMENTS

| 5,912,986 A | 6/1999 | Shustorovich |
| 6,028,956 A | 2/2000 | Shustorovich et al. |

(Continued)

FOREIGN PATENT DOCUMENTS

| CN | 101185063 A | 5/2008 |
| GB | 2406485 A | 3/2005 |

(Continued)

OTHER PUBLICATIONS

Final Office Action received for U.S. Appl. No. 13/710,322, dated on Apr. 15, 2016, 17 pages.

(Continued)

*Primary Examiner* — Arvin Eskandarnia
(74) *Attorney, Agent, or Firm* — Greenberg Traurig, LLP

(57) ABSTRACT

A digital security threat management system is disclosed. The system detects the presence of a computing system, on a network, that has been compromised by an undetected and/or unknown digital security threat. The digital security threat management system recognizes characteristic emanations from a computer system that has been compromised. Because the characteristic emanations that result from a known threat can be the same as the characteristic emanations that result from an undetected and/or unknown threat, the digital security threat management system can learn to detect a computing system that has been compromised by an unknown threat if the security threat management system recognizes characteristic emanations from a previous attack, based on a known threat, of the computing system. In this way, the system can detect the presence of a compromised computing system, even if the cause of the compromise remains undetected and/or unknown. Appropriate remedial action may be taken upon detection.

45 Claims, 11 Drawing Sheets

Related U.S. Application Data continuation of application No. 13/752,268, filed on Jan. 28, 2013, now Pat. No. 8,856,324.

(51) Int. Cl.
*G06N 99/00* (2010.01)
*H04L 12/801* (2013.01)
*H04L 29/12* (2006.01)

(52) U.S. Cl.
CPC .... *H04L 29/06931* (2013.01); *H04L 63/0245* (2013.01); *H04L 63/14* (2013.01); *H04L 63/1416* (2013.01); *H04L 63/1466* (2013.01); *H04L 69/22* (2013.01); *H04L 47/193* (2013.01); *H04L 61/6063* (2013.01)

(56) References Cited

U.S. PATENT DOCUMENTS

| | | | |
|---|---|---|---|
| 6,891,978 | B1 | 5/2005 | Takano |
| 6,920,504 | B2* | 7/2005 | Bender et al. ............... 709/232 |
| 7,336,378 | B2 | 2/2008 | Ichikawa et al. |
| 7,773,618 | B2* | 8/2010 | Leonard ............ G06F 15/17381 370/396 |
| 8,347,391 | B1 | 1/2013 | Flowers |
| 8,661,241 | B1* | 2/2014 | Orr ............................... 713/151 |
| 8,726,382 | B2* | 5/2014 | Knapp et al. ................. 726/23 |
| 2007/0150954 | A1 | 6/2007 | Shon |
| 2008/0052774 | A1 | 2/2008 | Chesla et al. |
| 2008/0134329 | A1 | 6/2008 | Perreault et al. |
| 2008/0141374 | A1 | 6/2008 | Sidiroglou et al. |
| 2009/0158435 | A1 | 6/2009 | Milliken et al. |
| 2010/0050256 | A1* | 2/2010 | Knapp et al. ................. 726/22 |
| 2010/0077483 | A1 | 3/2010 | Stolfo et al. |
| 2010/0106976 | A1 | 4/2010 | Aciicmez et al. |
| 2012/0227108 | A1 | 9/2012 | Noel et al. |
| 2014/0068023 | A1* | 3/2014 | Arickan ....................... 709/220 |

FOREIGN PATENT DOCUMENTS

| | | |
|---|---|---|
| WO | 2003/100616 A1 | 12/2003 |
| WO | 2007/070838 A2 | 6/2007 |
| WO | 2007/070838 A3 | 7/2008 |
| WO | 2013/176704 A1 | 11/2013 |

OTHER PUBLICATIONS

International Preliminary Report on Patentability received for PCT Patent Application No. PCT/US2012/72170, dated on Jun. 11, 2013, 7 pages.

International Preliminary Report on Patentability received for PCT Patent Application No. PCT/US2014/013136, dated on Sep. 24, 2015, 8 pages.

International Search Report and Written Opinion received for PCT Patent Application No. PCT/US2012/72170, dated on Mar. 18, 2013, 8 pages.

International Search Report and Written Opinion received for PCT Patent Application No. PCT/US2014/013136 dated on Jun. 13, 2014, 9 pages.

Non Final Office Action received for U.S. Appl. No. 13/479,222 dated Aug. 3, 2012, 12 pages.

Non-Final Office Action received for U.S. Appl. No. 13/710,322, dated on Dec. 14, 2015, 13 pages.

Non-Final Office Action received for U.S. Appl. No. 13/710,322, dated on Mar. 27, 2015, 15 pages.

Non-Final Office Action received for U.S. Appl. No. 14/407,445, dated on May 20, 2016, 6 pages.

Notice of Allowance received for U.S. Appl. No. 14/407,445, dated on Sep. 9, 2016, 9 pages.

Notice of Allowance received for U.S. Appl. No. 13/479,222, dated Nov. 28, 2012, 5 pages.

Notice of Allowance received for U.S. Appl. No. 13/710,322, dated Dec. 7, 2016, 5 pages.

Office Action received for Chinese Patent Application No. 201280073333.6, dated Sep. 20, 2016, 33 pages (18 pages of English Translation and 15 pages of Official Copy).

IP.com, "A Method to send multi TCP packets over an IP packet," Prior Art Database Technical Disclosure, IP.com No. IPCOM000219755D, Jul. 11, 2012, 8 pages.

IP.com Searches, Jun. 5, 2014, 9 pages.

Notice of Allowance received for U.S. Appl. No. 13/752,268, dated on Jun. 24, 2014, 10 pages.

Notice of Allowance received for U.S. Appl. No. 14/490,543, dated Jan. 21, 2016, 10 pages.

\* cited by examiner

| | | FREQUENCY |
|---|---|---|
| 920 — | 101 48 52 . . . | 80% |
| 921 — | 101 48 52 . . . | 80% |
| 922 — | 53 101 . . . | 30% |

1200 — 52 101 48 57 101 48 48 48 48 99 53 56 101 48 48 56 98 ...   NORMAL
1201 — 98 48 98 48 48 98 48 51 99 50 53 97 97 51 100 98 48 ...   ABNORMAL
1202 — 51 99 50 98 50 51 99 50 53 48 98 97 48 48 100 62 77 ...   ABNORMAL
1203 — 57 48 48 101 48 57 48 48 55 48 53 56 101 51 99 57 ...   NORMAL
1204 — 55 48 101 48 57 99 48 55 48 98 53 48 49 53 98 48 ...   NORMAL
1205 — 48 48 53 51 99 53 57 98 48 101 48 57 101 48 101 48 ...   NORMAL
1206 — 48 98 51 99 50 56 50 48 48 56 49 50 48 56 100 97 56 ...   NORMAL
1207 — 48 56 48 56 48 56 49 56 48 56 50 57 48 99 48 57 48 ...   NORMAL
1208 — 102 102 56 99 51 99 98 10 2 99 52 55 100 57 52 50 97 ...   NORMAL
1209 — 98 48 98 51 48 99 50 49 101 49 101 53 101 49 48 101 49 ...   ABNORMAL

1210 — ( 51 99 50 53 48 )

FIG. 12 ized by an undetected attack comprises obtaining a plurality of network packets from a network. The obtained plurality of network packets comprises network packets categorized as Transmission Control Protocol (TCP) packets and Internet Protocol (IP) packets. The obtained plurality of network packets include network packets containing an attack based on a known threat on the computing device, where the known threat is different from the undetected threat. The obtained plurality of network packets also includes network packets from the computing device before the attack, and network packets from the computing device after the attack. A plurality of combined packets is created from at least a subset of the plurality of TCP packets and IP packets, where a first combined packet of the plurality of combined packets comprises a portion of at least one of the TCP packets and a portion of at least one of the IP packets, and where a second combined packet of the plurality of combined packets comprises a portion of at least one of the TCP packets and a portion of at least one of the IP packets. The second combined packet is different from the first combined packet. A first sequence is created by converting bitwise content of at least a portion of the first combined packet into a first plurality of integers, where the first sequence includes the first plurality of integers. A second sequence is created by converting bitwise content of at least a portion of the second combined packet into a second plurality of integers, where the second sequence includes the second plurality of integers. A similarity metric is determined between the first sequence and the second sequence based on a distance function. A third sequence is created based on the similarity metric, where the third sequence comprises a third plurality of integers common to the first sequence and the second sequence, in the first order. A fourth sequence is created, where the fourth sequence is a meta-expression that comprises a subset of the third plurality of integers of the third list, in the first order, and that represents that the computing device is compromised by a threat. The meta-expression is stored, and the stored meta-expression is used to detect that the computing device has been compromised by the undetected threat.

In one exemplary embodiment, a networking device for detecting a networked computing device that is compromised by an undetected attack comprises a network port for connecting to a network infrastructure, where the network port is adapted to obtain a plurality of network packets, and where the obtained plurality of network packets comprises network packets categorized as Transmission Control Protocol (TCP) packets and Internet Protocol (IP) packets. The obtained plurality of network packets include: network packets containing a known attack on the computing device, the known attack different from the undetected attack, network packets from the computing device before the known attack, and network packets from the computing device after the known attack. The networking device also comprises a processor connected to the network port, where the processor is adapted to create a plurality of combined packets, from at least a subset of the plurality of TCP packets and IP packets, where a first combined packet of the plurality of combined packets comprises a portion of at least one of the TCP packets and a portion of at least one of the IP packets, and a second combined packet of the plurality of combined packets comprises a portion of at least one of the TCP packets and a portion of at least one of the IP packets, wherein the second combined packet is different from the first combined packet. A first sequence is created by converting bitwise content of at least a portion of the first combined packet into a first plurality of integers, where the

SYSTEM AND METHOD FOR DETECTING A COMPROMISED COMPUTING SYSTEM

CROSS-REFERENCE TO RELATED APPLICATION

This application is a continuation of U.S. Non-provisional application Ser. No. 14/490,543 (now U.S. Pat. No. 9,350, 707), filed Sep. 18, 2014, which is a continuation of U.S. Non-provisional application Ser. No. 13/752,268 (now U.S. Pat. No. 8,856,324), filed Jan. 28, 2013, the content of which is incorporated herein by reference in its entirety and for all purposes.

BACKGROUND

1. Field

The present disclosure relates generally to the field of digital security, and more specifically to detecting a computing system that has been compromised by a digital security threat.

2. Description of Related Art

The proliferation of computing technologies continues to present challenges in the field of digital security. As is well-known, a malicious entity can use one networked computer (i.e., a network node) to spread malicious computer data to other network nodes, and thereby inflict system disruption and economic loss. Network nodes that become compromised may further spread malicious computer data to additional network nodes and cause additional damage.

One of ordinary skill in the art would appreciate that a networked computer (or more generally, a computing system) can be susceptible to attacks such as those that are based on computer viruses, malware, worms, Trojan horses, bots, intrusions (e.g., unauthorized access), exploits (e.g., escalation of privileges, violation of confidentiality), time-based attacks (e.g., Denial of Service), or the like. The term "threat" is used to describe one or more of these types of attacks.

Digital security technologies may be used to counter these types of attacks by detecting and/or removing malicious computer data from computing systems. One of ordinary skill in the art would appreciate that digital security technologies can reside at various network nodes, can be packaged in hardware and/or software form, and encompass technologies that are loosely called "anti-virus software", "malware detection", "intrusion prevention", "anti-attack", firewall, or the like, though the terms are not identical in meaning. A broader term, "Unified Threat Management" ("UTM"), has also been used to describe one or more of these implementations of digital security technologies.

Conventional digital security technologies typically detect threats using signatures that correspond to specific threats, meaning that the detection of a threat relies on the a priori knowledge of the specific threat and the availability of a signature for that specific threat. For example, conventional digital security technologies may scan a computing system using the signature of a given computer virus to detect whether the given computer virus is present in the computing system. One drawback of these types of technologies is that threats for which signatures are not yet available cannot be detected.

BRIEF SUMMARY

In one exemplary embodiment, a computer-implemented method for detecting a computing device that is comprofirst sequence includes the first plurality of integers. A second sequence is created by converting bitwise content of at least a portion of the second combined packet into a second plurality of integers, where the second sequence includes the second plurality of integers. A similarity metric is determined between the first sequence and the second sequence based on a distance function. A third sequence is created based on the similarity metric, wherein the third sequence comprises a third plurality of integers common to the first sequence and the second sequence, in the first order. A fourth sequence is created, where the fourth sequence is a meta-expression that comprises a subset of the third plurality of integers of the third list, in the first order, and represents that the computing device is compromised by an attack. The networking device also comprises a memory connected to the processor, where the memory is adapted to store the meta-expression, where the stored meta-expression is used to detect that the computing device is compromised by the undetected attack.

In one exemplary embodiment, a non-transitory computer-readable storage medium having computer-executable instructions for detecting a computing device that is compromised by an undetected attack, the computer-executable instructions, when executed by one or more processors, cause the one or more processors to perform the acts of obtaining a plurality of network packets from a network, where the obtained plurality of network packets comprises network packets categorized as Transmission Control Protocol (TCP) packets and Internet Protocol (IP) packets. The obtained plurality of network packets include network packets containing a known attack on the computing device, the known attack different from the undetected attack, network packets from the computing device before the known attack, and network packets from the computing device after the known attack. The computer-executable instructions also include instructions for creating a plurality of combined packets from a subset of the plurality of TCP packets and IP packets, where a first combined packet of the plurality of combined packets comprises a portion of at least one of the TCP packets and a portion of at least one of the IP packets, and a second combined packet of the plurality of combined packets comprises a portion of at least one of the TCP packets and a portion of at least one of the IP packets, where the second combined packet is different from the first combined packet. The computer-executable instructions also include instructions for creating, by the one or more processors, a first sequence by converting bitwise content of at least a portion of the first combined packet into a first plurality of integers, where the first sequence includes the first plurality of integers. The computer-executable instructions also include instructions for creating, by the one or more processors, a second sequence by converting bitwise content of at least a portion of the second combined packet into a second plurality of integers, where the second sequence includes the second plurality of integers. The computer-executable instructions also include instructions for determining a similarity metric between the first sequence and the second sequence based on a distance function. The computer-executable instructions also include instructions for creating a third sequence based on the similarity metric, where the third sequence comprises a third plurality of integers common to the first sequence and the second sequence, in the first order. The computer-executable instructions also include instructions for creating a fourth sequence, where the fourth sequence is a meta-expression that comprises a subset of the third plurality of integers of the third list, in the first order, and represents that the computing device is compromised by an attack. The computer-executable instructions also include instructions for storing the meta-expression, where the stored meta-expression is used to detect that the computing device is compromised by the undetected attack.

DESCRIPTION OF THE FIGURES

FIGS. 9(A)-(F) depict exemplary network packets.

FIGS. 10(A)-(C) depict exemplary sequences of 8-bit integers.

FIG. 12 depicts exemplary groups of network packets.

DETAILED DESCRIPTION

Figure 1:
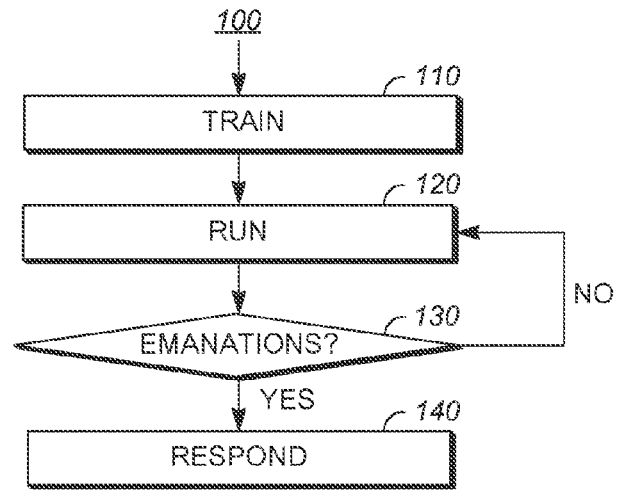
FIG. 1 depicts an exemplary process for detecting a compromised computing system.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Digital security technologies that detect digital security threats using threat-specific signatures are vulnerable to threats that target unknown vulnerabilities in a computing system, because threat-specific signatures are difficult, if not impossible, to create for threats that target unknown vulnerabilities (hereafter "unknown threats"). An exemplary unknown threat is a "zero-day" exploit. "Zero-day" exploits are understood by those of ordinary skill in the art to refer to vulnerabilities that exist in the code base of a computer application but have not been publicly exploited. Another exemplary unknown threat is a new computer virus that is not related to any existing computer virus. For obvious reasons, unknown threats such as these can pass undetected through digital security technologies that rely on threat-specific signatures that are created from a priori knowledge of the threats.

While a computing system may succumb to unknown threats that avoid detection, Applicants have discovered that a computing system, when compromised, gives characteristic emanations that are indicative of the computing system's compromised condition. These characteristic emanations are involuntary, meaning that they are not influenced nor controlled by an attacking threat; rather, the characteristic emanations are independent of the cause of the attacking threat. Thus, by monitoring computing systems for these characteristic emanations, particularly in network traffic to and from networked computing systems, the existence of a compromised computing system in a network can be identified and addressed promptly. For instance, a compromised computing system can be cloaked from a network so that it is no longer accessible to a remote malicious entity.

Notably, prompt remedial action in response to a computing system compromise can mitigate or eliminate actual damage, even if the compromise itself is not avoided. Consider, for instance, a situation in which a malicious user gains unauthorized access to a data server using a zero-day vulnerability in the data server's secure shell secure communication tunnel (e.g., SSH). Although the communication tunnel of the data server, once compromised, provides the malicious user with elevated server access, the compromised data server also transmits characteristic emanations onto the network, which can be detected by a threat management system (e.g., a firewall) that is operating on the network within fractions of a second. Immediately thereafter, the threat management system can cloak the compromised data server from the network to prevent any additional network traffic, including those from the malicious user, from reaching the compromised data server. Thus, even though the malicious user succeeded in gaining unauthorized access, the access is promptly severed, thereby leaving the malicious user with little time, if any, to inflict damage.

The embodiments described herein include techniques for recognizing characteristic emanations from a computing system that indicate the computing system has been compromised by a digital security threat and for performing appropriate responsive action.

The concepts of "network traffic" and "network packets" are well-known in the art and are not detailed here. As an example, "network traffic" contains "network packets" such as Ethernet packets, Transmission Control Protocol (TCP) packets, Internet Protocol (IP) packets, or the like. The term "characteristic emanations" is used here to refer to computer data, contained in network packets, that is indicative of the compromised condition of a computing system. For example, a compromised computing system may transmit malformed network packets that are un-routable and that consist of strings of zero bit values. One or more aspects of the contents of the malformed network packets may be a characteristic emanation for the particular computing system. Recall, as stated above, characteristic emanations indicate the compromised condition of a computing system, and characteristic emanations are independent of the cause of the compromise.

A computing system may produce different characteristic emanations depending on what part of the computing system is compromised. Generally speaking, characteristic emanations may be tied, in some cases, to the hardware configuration of a computing system. Also, characteristic emanations may be tied, in some cases, to the software configuration of a computing system. The software configuration of a system includes, for example, the particular services and the particular operating system that is operating on the computing system. More specifically, a computing system can host a variety of services such as particular versions of SSH, telnet, HTTP, database listeners, and so forth. The services can be run from a particular kernel(s) of a version of an operating system, such as MICROSOFT WINDOWS SERVER 2012, ORACLE SOLARIS 11, or the like.

More specifically, characteristic emanations that are produced by a compromised computing system may depend, for example, on the service that is compromised and the operating system that is supporting the compromised service. That is to say, a SOLARIS-based server may provide one characteristic emanation when its SSH communication tunnel is compromised, and provide another characteristic emanation when its JAVA client is compromised. In similar vein, a WINDOWS-based server may provide yet another distinct characteristic emanation when its database listener is compromised.

1. Overview

FIG. 1 illustrates exemplary process 100 for detecting a networked computing system that has become compromised, by recognizing characteristic emanations from the comprised computing system in network traffic. Within process 100, block 110 may be referred to as a training process, while blocks 120-140 may be collectively referred to as a run-time process.

As used herein, the term "Unified Threat Management System" (UTMS) describes computer security technologies that carry out process 100, regardless of whether the technologies are provided in software form (e.g., as a software package) or in hardware form (e.g., an application-specific circuit or device). The training aspects of process 100 (i.e., block 110) and the run-time aspects of process 100 (i.e., blocks 120-140) may be implemented onto the same, or onto different UTMSs.

Also, the terms "train" and "training" are relied upon for their plain meanings in the English language. That is, consistent with their dictionary meanings, the terms "train" and "training" are used to describe processes that help a UTMS attain the ability to recognize characteristic emanations that indicate the existence of a compromised computing system. However, the terms "train" and "training" should not be interpreted as implying a particular implementation of process 100, such as the implementation of a support vector machine, which, coincidentally, is sometimes associated with the term "training".

An exemplary implementation of process 100 is now discussed with reference to FIG. 1. At block 110, a UTMS is trained to recognize content in network traffic that indicates the presence of a compromised computing system. During block 110, the UTMS is provided with a series of training network traffic that reflects: (i) normal communication between two computing systems, (ii) the introduction of a known threat that successfully compromises one of the computing systems, and (iii) communication involving the compromised computing system after the successful compromise. The introduction of a known threat that successfully compromises a computing system causes the computing system to produce characteristics emanations that indicate its compromised condition. These characteristic emanations, found in (iii), are useful to the training process, and are used at block 110, along with (i) and (ii) to identify bounded sequences of computer data. These bounded sequences of computer data are important because they can be used, by a UTMS, to later detect the presence of a compromised computing system using network traffic, regardless of whether the computing system was compromised by the same known threat, or by another unknown threat.

Network traffic representing communication between two computing systems may be obtained from, for example, a network packet capture application programming interface ("API"), such as "pcap". Although the names of APIs and/or repositories may change from time to time, the concept of capturing network traffic should be within the grasp of one of ordinary skill in the art. Further, the obtaining and introduction of a known threat (e.g., a known exploit) to a computing system should also be within the grasp of one of ordinary skill in the art, since many computer threats are available from software repositories in the form of computer-executable code (e.g., ".EXE" files) that can be readily executed on a computing system.

At block 120, the UTMS uses the bounded sequences of computer data (obtained from block 110) to monitor a set of network traffic and to determine if the network traffic contains characteristic emanations that indicate the presence of a compromised computing system. That is, the UTMS may determine if a network node in the network has been compromised using the bounded sequences of computer data that are obtained from block 110.

At decision block 130, the UTMS decides whether characteristic emanations are found in a set of network traffic that is being monitored. If characteristic emanations are found, meaning that a compromised computing system is present in the network, processing proceeds to block 140, where the UTMS generates one or more appropriate responses. An appropriate response may be a user or system alert. Another appropriate response may be to scrub any network traffic from the source of the characteristic emanations, i.e., the compromised network node, such that an attacking network node cannot continue to receive affirmative responses from the compromised network node. Yet another appropriate response may be to cloak the compromised network node, so that an attacking network node can no longer reach the target network node and thus cannot continue the attack. If no characteristic emanation is found, processing returns to block 120, and the UTMS monitors another set of network traffic for the presence of characteristic emanations.

Process 100 is notable in at least two ways. First, the bounded sequences of computer data that are created at block 110 correlate to characteristic emanations that are indicative of a compromised computing system, but the bounded sequences of computer data need not correlate to the actual cause of the compromise. As such, these bounded sequences of computer data allow a UTMS to recognize that a computing system has been compromised, independent of what caused the compromise. This result is beneficial, because a UTMS could still operate if the actual cause of a compromise has never been previously seen. Second, process 100 produces bounded sequences of data that are efficient in structure and in size as compared to signature files that are used by (conventional) digital security technologies. This result is also beneficial, because tremendous computational efficiencies can be realized during operation of a UTMS using process 100.

Figure 2:
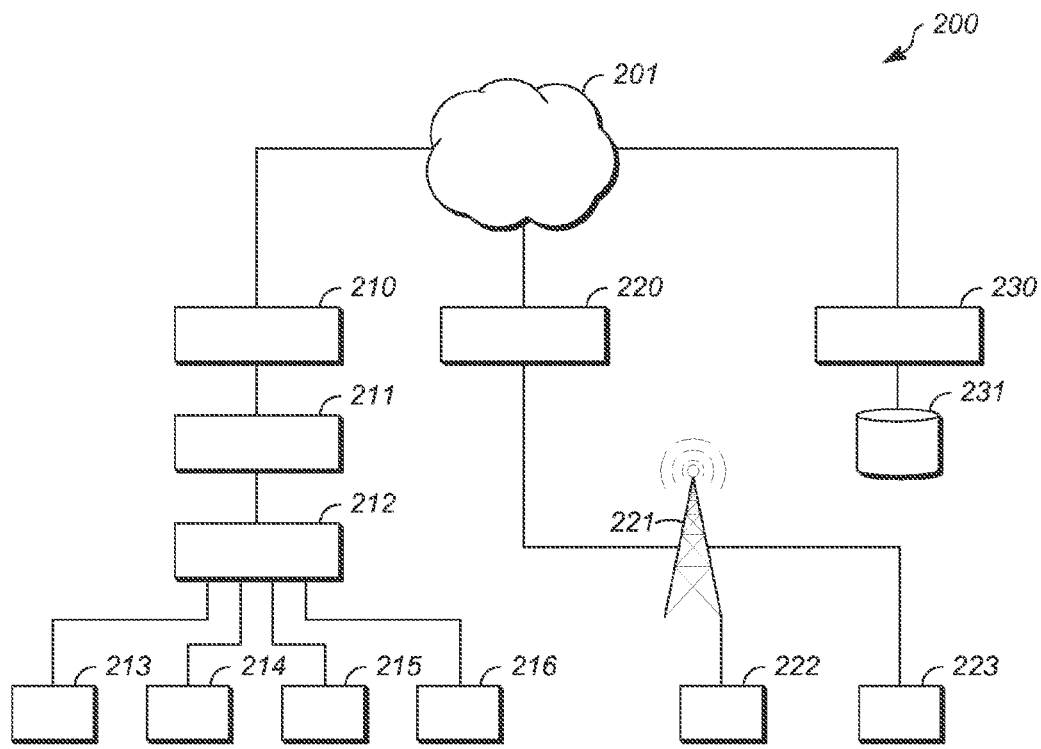
FIG. 2 depicts a block diagram of a network employing exemplary embodiments of the Unified Threat Management System (UTMS).

FIG. 2 is a network diagram illustrating an exemplary deployment of process 100 (FIG. 1) onto a network. As shown in FIG. 2, desktop and laptop computers 213-216 are connected to cloud network 201 via cable modem 210, firewall 211, and router 212. Cellular phone 222 and tablet computer 223 are connected to network 201, wirelessly, via cellular service provider 220. Data center 231 is connected to cloud network 201 via modem 230. Portions of process 100 may be deployed onto network devices (e.g., firewall 211, router 212), endpoints (e.g., computers 213-216), gateway devices (e.g., modem 210, a gateway), mobile devices (e.g., cellular phone 222, tablet computer 223), or the like. In other words, portions of process 100 can be deployed onto one or more of network nodes 210-216, 220-223, and/or 230-231. For example, process 100 may be integrated into an operating system kernel running on cellular phone 222, tablet computer 223, and/or computers 213-216. Process 100 (FIG. 1) may also be integrated into the hardware of cable modem 210, UTMS 211, and/or router 212.

2. Training

Figure 3:
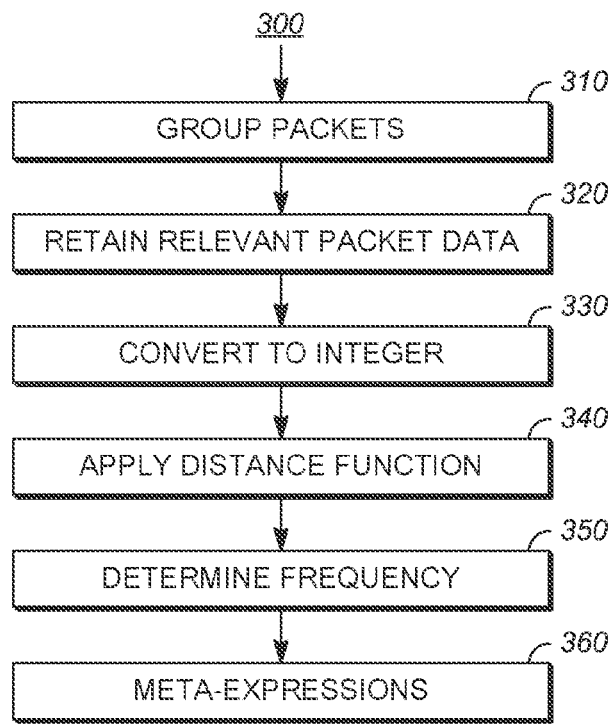
FIG. 3 depicts an exemplary process for training a UTMS.

FIG. 3 illustrates an exemplary process 300 for training a UTMS. In one embodiment, process 300 performs the features of block 110 (FIG. 1). At block 310, network traffic is obtained, and a series of network packets that are sent between (i.e., to and from) two network nodes is grouped together. Some or all of the grouped network packets may be consecutive. As discussed above, the network traffic that is used to train a UTMS includes (i) normal communication between two network nodes before one of the network nodes becomes compromised, (ii) the introduction of a known threat that successfully compromises one of the network nodes, and (iii) communication involving the compromised network node after the successful compromise, which contains characteristic emanations from the compromised network node.

In some embodiments, the grouping of network packets between two network nodes at block 310 is bidirectional because network traffic both to and from a pair of network nodes are grouped together. Bidirectional network traffic typically consists of different levels of communication, from the initial handshake to the full transfer of data between the two network nodes. This grouping of (bidirectional) network packets is based on the existence of an established communication between two network nodes. An established communication between two network nodes is sometimes referred to as a "conversation". Two network nodes may request to establish a communication via one channel. For example, a host and a server may handshake on one port. Once communication is established, the two network nodes may communicate further through a newly created channel. For example, the host and the server may communicate through TCP/IP on another port that is different from the port through which the established communication was initially requested. In some embodiments, the grouping of network packets between two network nodes at block is unidirectional in that network traffic to, or from, one of the network nodes is grouped together.

In some embodiments, the grouping of (bidirectional) network packets at block 310 begins with the identification of a network packet in network traffic that represents the beginning of an established communication, and another network packet in the network traffic that represents the end of the established communication. The beginning of an established communication may be a network packet that contains a request. The end of an established communication may be a network packet that contains a corresponding acknowledgment. In one embodiment, additional network packets may be identified, such as a network packet that represents a "request-acknowledgement". Network packets at different layers of the OSI model may provide request and acknowledgement information. For example, both HTTP network packets (i.e., at the OSI application layer) and TCP network packets (i.e., at the OSI transport layer) contain request fields, either of which is sufficient for purposes of block 310. In this way, block 310 may group together bidirectional network packets that correspond to an established communication without relying on source network addresses and destination addresses. Block 310 may also group together bidirectional network packets that correspond to an established communication without relying on source and destination port numbers.

Figure 4:
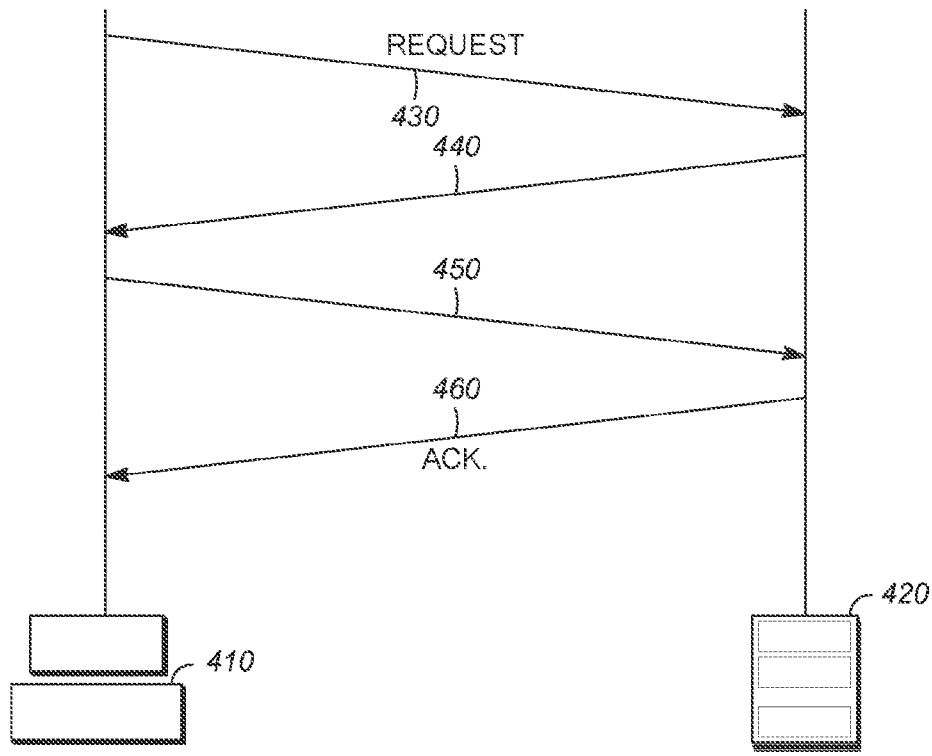
FIG. 4 depicts an exemplary transmission of network packets between network nodes.

Block 310 is now discussed with reference to FIG. 4. As shown, network packets 430-460 represent a series of network packets between network nodes 410 and 420. Network packet 430 is sent by network node 410 to network node 420, and includes a request. Thus, network packet 430 indicates the beginning of a series of network packets that are to be grouped together. In this context, network node 410 may be referred to as a host because network node 410 initiated a request, and network node 420 may be referred to as a server because network node 420 is the recipient of the request. Network packets 440 and 450 are sent by network nodes 420 and 410, respectively, and represent bidirectional communication of data between the two network nodes that should be grouped together. Network packet 460 is sent by network node 420 to network node 410 to acknowledge that an appropriate amount of data has been received. Thus, network packet 460 indicates the end of the series of network packets that are to be grouped together. In this way, network packets 430 to 460 are grouped together at block 310 (FIG. 3) into a bounded group of network packets. This group of network packets is referred to as being "bounded" because there is a clear beginning and a clear end to the group of data. Block 310 may be repeated to produce additional groups of bidirectional network packets between pairs of network nodes.

Figure 5:
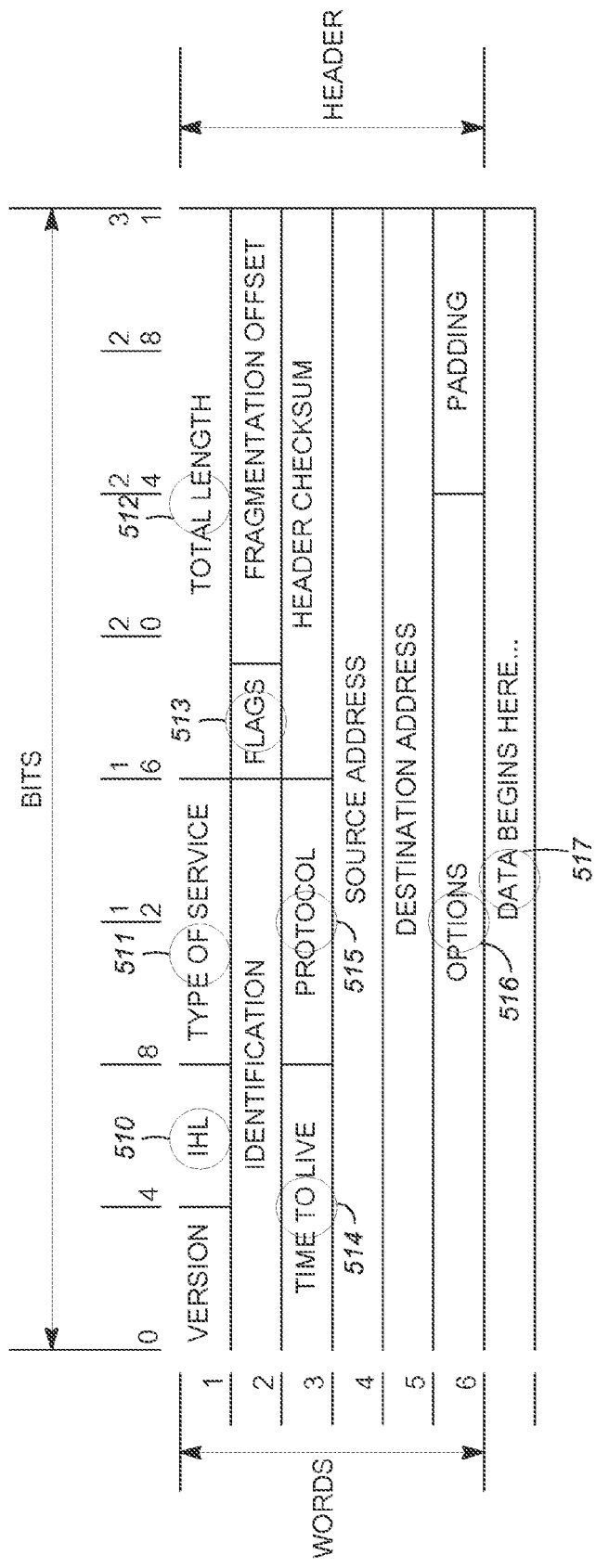
FIG. 5 depicts the layout of an IP packet header.
Figure 6:
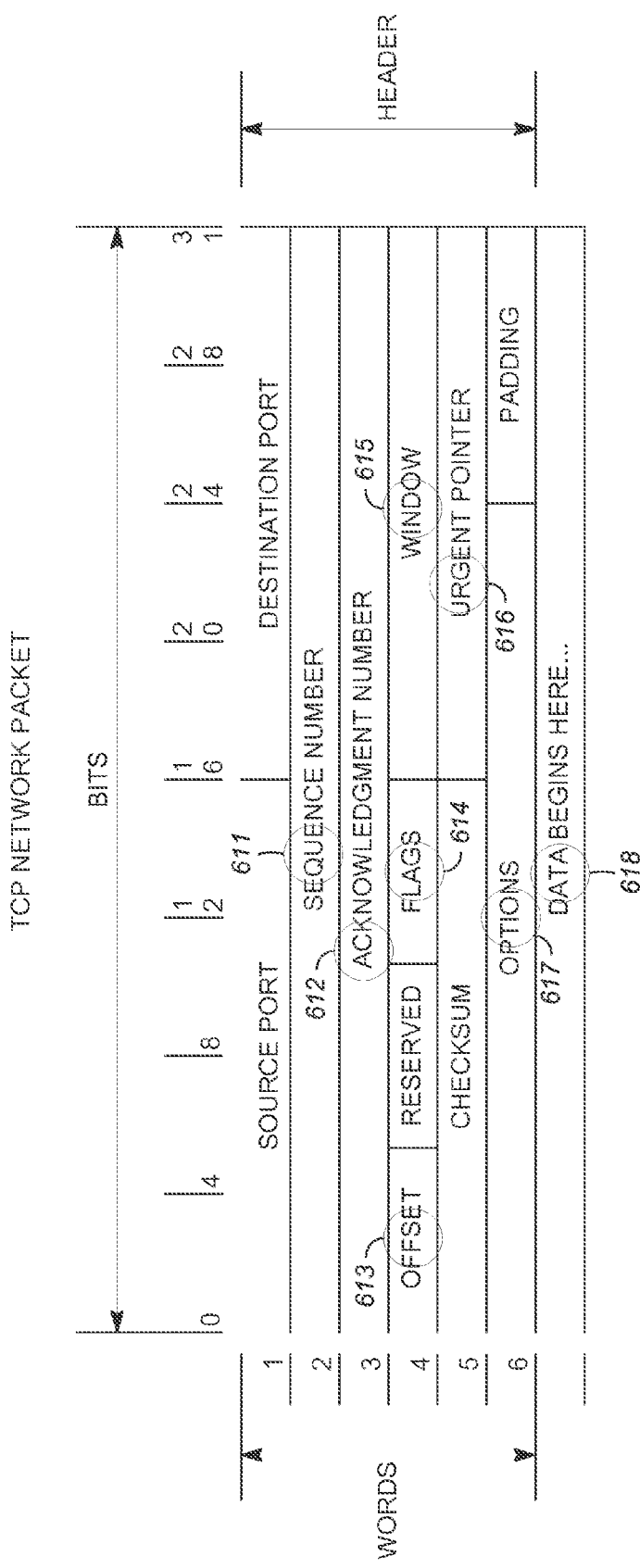
FIG. 6 depicts the layout of a TCP packet header.

Only certain fields within the network packets that are grouped by block 310 are relevant to detecting compromised computing systems. At block 320, the relevant information is retained, and extraneous information is discarded. Block 320 is now discussed with reference to FIGS. 5 and 6. FIG. 5 illustrates the layout of an IP network packet, with the fields relevant to detecting compromised computing systems circled. These relevant fields include Type of Service ("TOS") 511, Total Length (of IP network packet) 512, IP Flags 513, Time to Live 514, Protocol 515, IP Options 516, and data content 517. FIG. 6 illustrates the layout of a TCP network packet, with the fields relevant to detecting compromised computing systems circled. These fields include Sequence Number 611, Acknowledgment Number 612, Offset 613, TCP Flags 614, Window 615, Urgent Pointer 616, TCP Options 617, and data content 618. In this way, the output of block 310 is reduced to contain only information that is relevant to detecting compromised computing systems. This retention process is applied to each IP and TCP network packet that is in the groups of network packets produced by block 310. The output of block 320 is referred to as "reassembled packets".

At least two aspects of block 320 are noteworthy. First, block 320 does not retain the source or destination addresses in an IP network packet or the source or destination port numbers in a TCP network packet. Thus, a UTMS using process 300 does not need to rely on network address nor port information in order to detect the existence of a compromised computing system (though the network address and port information may be subsequently used to identify the precise network location of specific compromised computing system). Second, Header Length (IHL) 510 (FIG. 5) is used to determine the length of an IP network packet header so that the relevant fields within the IP network packet can be properly grouped, but Header Length (IHL) 510 is not itself retained in the output of block 320.

At block 330, the reassembled packets (i.e., relevant information) from block 320 are converted, bitwise, into integers, thereby producing sequences of integers that correspond to a subset of the information originally provided to process 300. In one embodiment, 8-bit integers are used. One of ordinary skill in the art would appreciate that IP and TCP network packets contains fields that are less than 8 bits, exactly 8 bits, and more than 8 bits long. Fields that span less than 8-bits are converted to 8-bit representation by padding zeros to the most significant output bits. For example, block 330 converts bits "100" to "0000 0100". TOS 511 and IP Flags 513 (FIG. 5), which are 4-bit and 3-bit fields, respectively, are converted in this way. Fields that span more than 8-bits are converted into multiple 8-bit segments. For example, block 330 converts bits "0001 0010 0100 1000" to "0001 0010" and "0100 1000". Data content 517, which spans more than 8-bits, is converted in this way.

Figure 7:
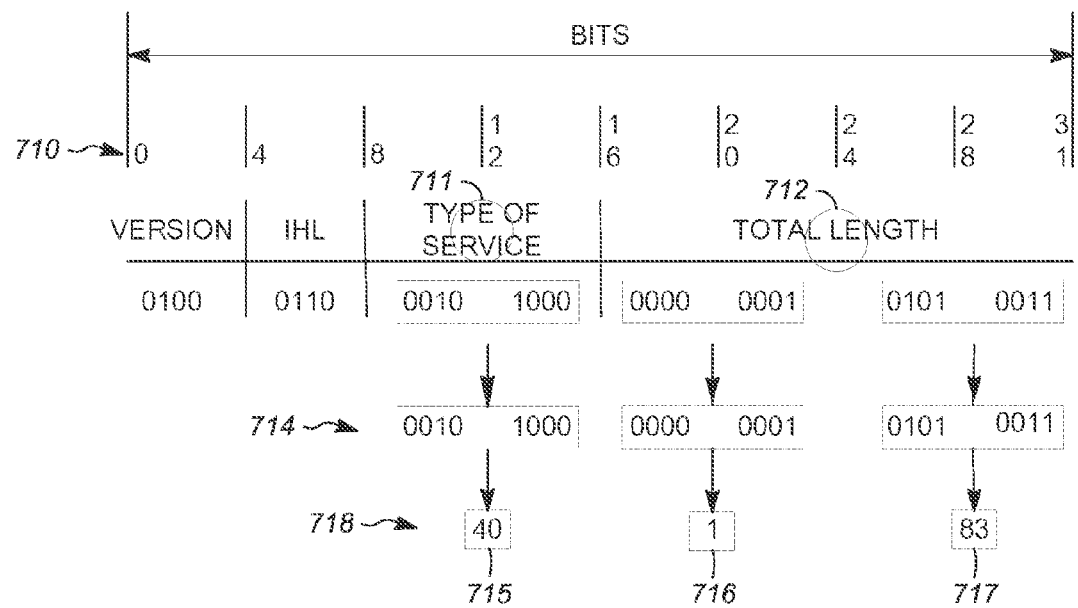
FIG. 7 depicts exemplary values in an IP network packet header.

Blocks 320 and 330 are now discussed with reference to FIG. 7. FIG. 7 illustrates a portion of an IP network packet. As discussed above, within IP network packet 710, TOS 711 and Total Length 712, among others, are useful for detecting compromised computing systems. Thus, fields 711 and 712 are retained by block 320 and are provided to block 330 for conversion to integers. Reassembled packet 714 represents the portions of IP network packet 710 that are retained by block 320. Block 330 converts the contents of reassembled packet 714, bitwise, into 8-bit integers 715, 716, and 717. Note, for sake of simplicity, only a portion of an IP network packet 710 is shown in FIG. 7. During normal operation, block 320 processes the entire groups of IP and TCP network packets produced by block 310, and block 330 in turn processes the entire groups of IP and TCP network packets retained by block 320. In this way, block 330 produces a sequence of 8-bit integers 718 containing the integers "40 1 83 . . . ". Optionally, sequence of 8-bit integers 718 may be limited to 65,536 (8-bit) integers in length.

As used here, the term "sequence" describes a list of ordered elements, e.g., integers. It should be appreciated that the ordering of elements within sequence of integers 718 is derived from the ordering and adjacency of relevant portions of bidirectional network traffic processed by blocks 310-320. The response is further distilled in the processes of blocks 340-360, discussed below, so that it becomes useful for detecting the presence of a compromised computing system in an unknown set of network traffic.

At block 340, a distance function is used to identify characteristics from the sequences of integers produced by block 330. The distance function is performed against sequences of integers that are adjacent in time, meaning that a sequence of integers produced by block 330 (based on one group of network packets from block 320) is compared against the next, adjacent sequence of integers produced by block 330 (based on the next, adjacent group of network packets from block 320).

Conventional distance functions, such as string distance functions, are well-known in the art and are not discussed in detail here. As an example, a conventional string distance function may be used to determine that the strings "a b c" and "z b c" have a distance of 1, because the strings vary only in that "a" in the former is replaced with "z" in the latter, which represents the sole difference between the two strings. The groups of network packets produced by block 330 lend themselves to comparison by distance functions because block 330 produces sequences of integers, which may be treated as individual elements by a distance function. Conventional string distance functions, however, do not provide distance metrics that are sufficient for detecting compromised computing systems. For example, the knowledge that two strings differ by a distance of 1 provides little useful information in the present context.

Figure 8:
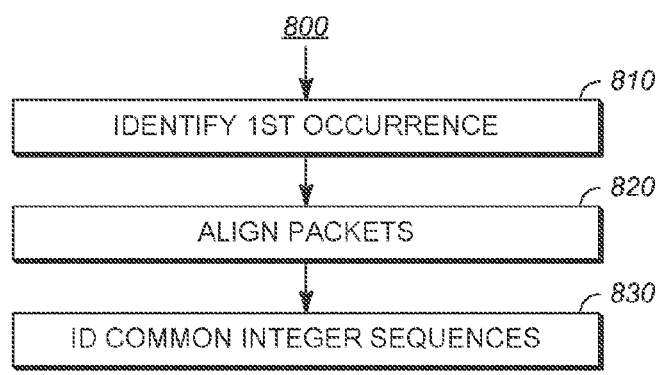
FIG. 8 depicts exemplary processes in an embodiment of a distance function.

In one embodiment, block 340 performs a custom distance function, described below, that produces reduced sequences of integers that support the detection of compromised computing systems. For purposes of illustration, the custom distance function of block 340 is discussed with references to FIGS. 8 and 9. FIG. 8 illustrates exemplary process 800 for performing the custom distance function, in one embodiment. FIG. 9 illustrates exemplary groups of network packets as they are processed by exemplary process 800, in the one present embodiment.

Figures 9A, 9B:
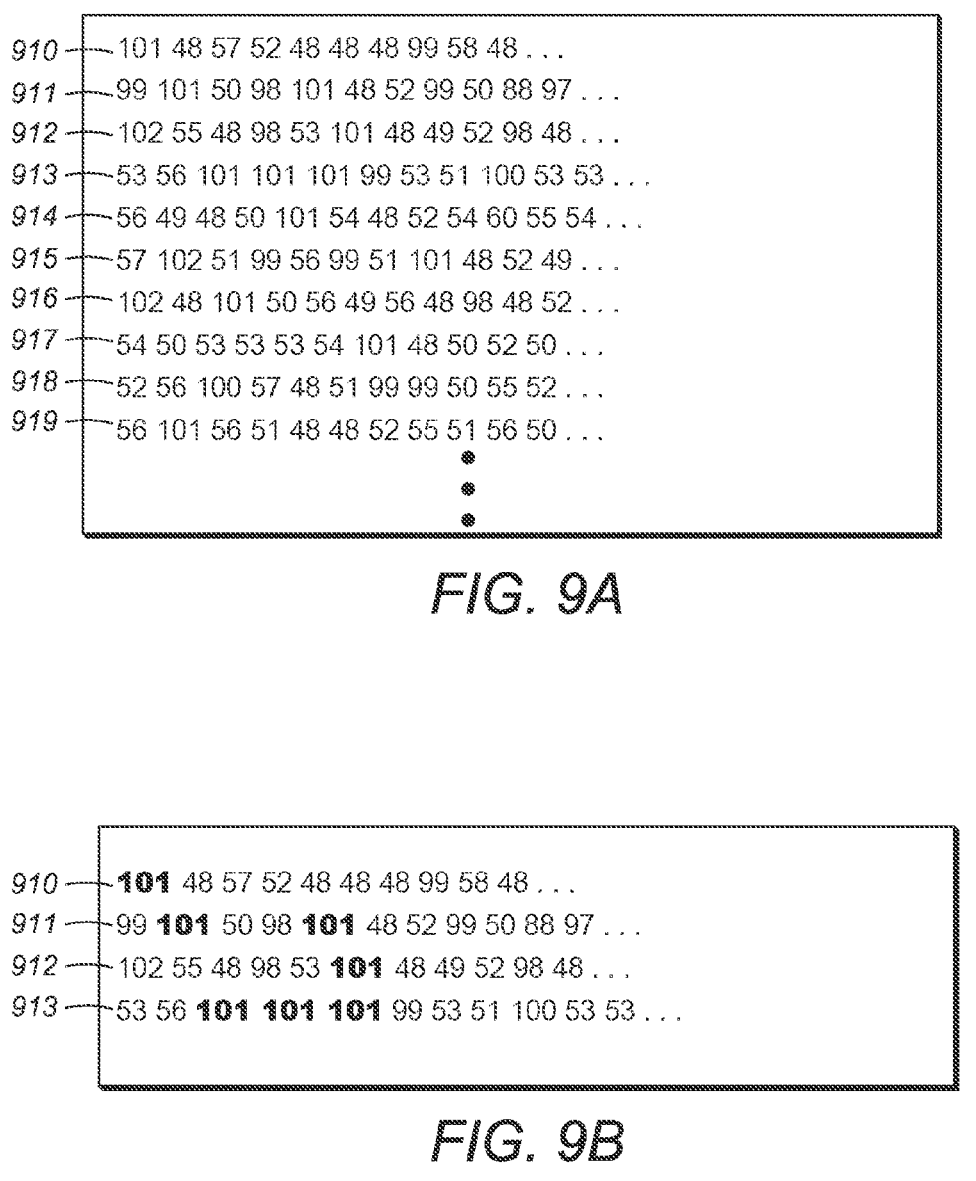
Figures 9C, 9D, 9E, 9F:
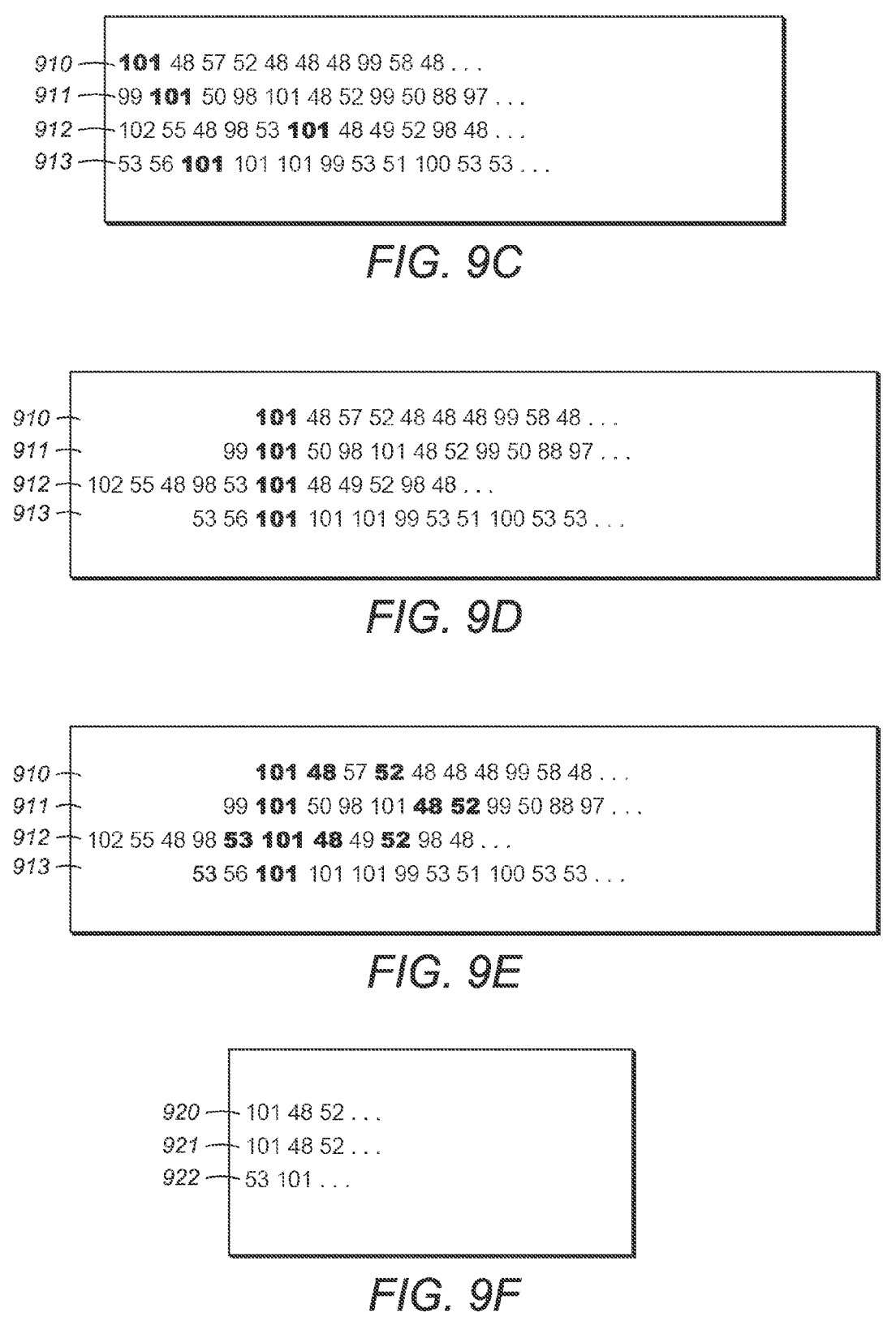

Turning to FIG. 8, at block 810, the custom distance function identifies integers that appear within adjacent pairs of sequences of integers produced by block 340 (FIG. 3). FIG. 9A illustrates exemplary sequences of integers 910-919. FIG. 9B illustrates exemplary integer "101", which appears in at least pairs of adjacent sequences of integers 910-911, 911-912, and 912-913. (Note, sequences of integers 914-919 are not illustrated for simplicity.) At block 810, the custom distance function also identifies the first instance of an identified integer in pairs of adjacent sequences of integers. FIG. 9C illustrates the first instance of "101" being identified in adjacent sequences of integers 910-911, 911-912, and 912-913.

At block 820 (FIG. 8), the custom distance function aligns the first instances of the identified integer in a pair of adjacent sequences of integers. FIG. 9D illustrates the alignment of the first instances of "101" in pairs of adjacent sequences of integers 910-911, 911-912, and 912-913.

At block 830 (FIG. 8), a reduced sequence of integers may be created, under some conditions, for a pair of adjacent sequences of integers. A reduced sequence of integers is created (for a pair of adjacent sequences of integers) if one or more of the integers that are common to the pair of adjacent groups of sequences of integers: (i) appear in the same order in the pair of adjacent groups of network packets, and (ii) have positions in the pair of adjacent groups of network packets that are within a first threshold distance. In one embodiment, the first threshold distance is four. If created, a reduced sequence of integers would comprise integers that satisfy requirements (i) and (ii) stated above (with respect to a pair of adjacent sequences of integers).

FIG. 9E illustrates that, when the first instance of "101" is aligned between sequences of integers 910 and 911, the integers "48" and "52" satisfy requirements (i) and (ii) stated above. Specifically, the integers "101", "48", and "52" appear in the same order in both sequences of integers 910 and 911. Further, the integer "48" appears in both sequences of integers 910 and 911 within the first threshold distance (of four, in the present embodiment). Thus, as shown in FIG. 9F, reduced sequence of integers 920 is created, and includes the sequence of integers "101 48 52". Also as shown in FIG. 9F, the integers "101" "48" and "52" in sequences of integers 911 and 912 also satisfy requirements (i) and (ii) stated above. Thus, reduced sequence of integers 921 is created, and includes the sequence of integers "101 48 52". Also as shown in FIG. 9F, the integers "53" and "101" in sequences of integers 912 and 913 also satisfy requirements (i) and (ii) stated above. Thus, reduced sequence of integers 922 is created, and includes the sequence of integers "53 101".

Blocks 810-830 repeat for other integers that appear within at least a pair of adjacent sequences of integers. For example, the integer "48" also appears in at least one pair of adjacent sequences of integers among sequences of integers 910-919. Thus, blocks 810-830 are repeated for 8-bit integer "48".

Figures 10A, 10B, 10C:
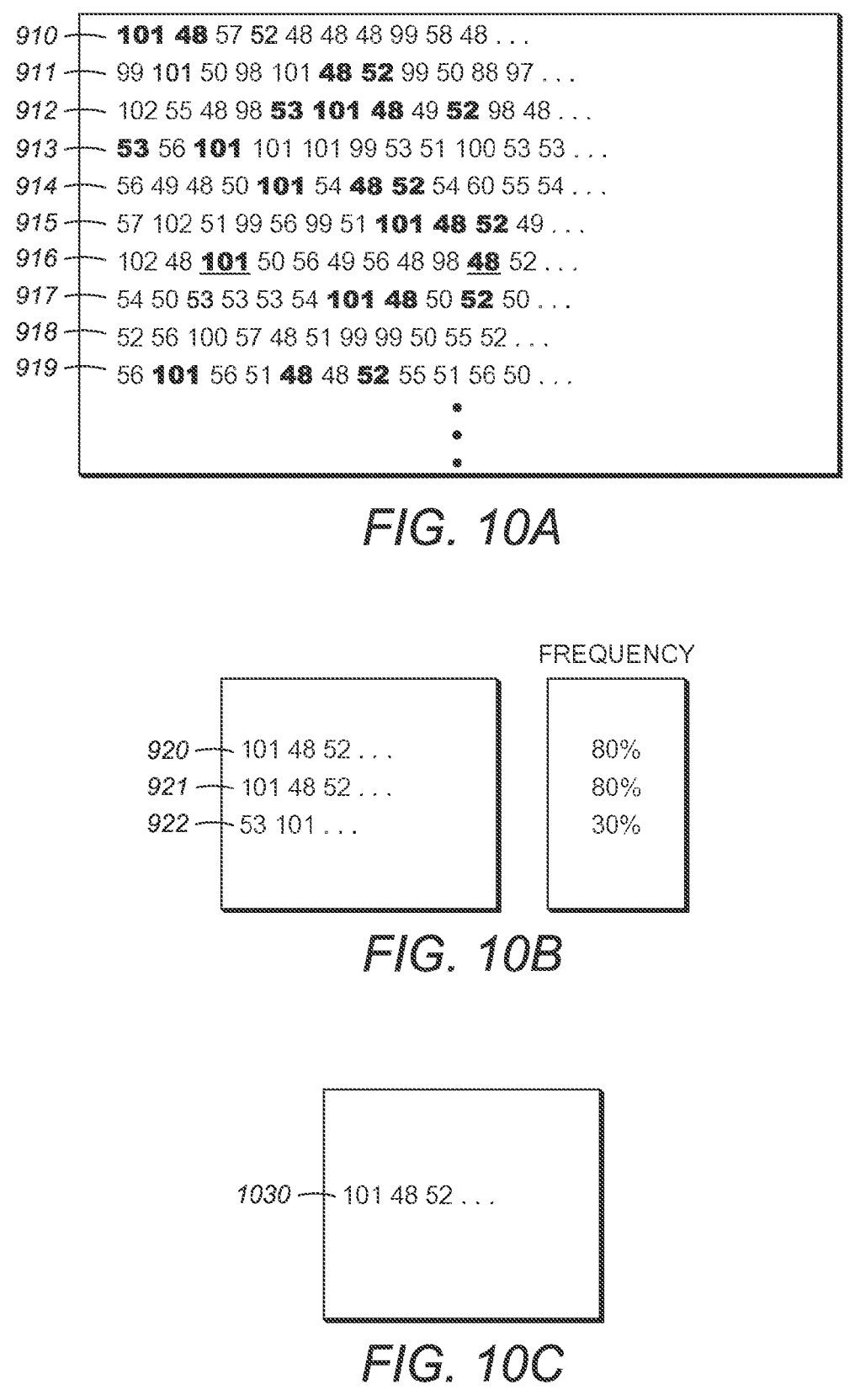

At the completion of block 830 (which is an exemplary string function carried out in block 340 of FIG. 3), processing proceeds to block 350 (FIG. 3). At block 350, the frequency at which a reduced sequence of integers appears, within a second threshold distance, in the groups of network packets created at block 330 is determined. The first and second threshold distances may be the same or may be different. In one embodiment, the second threshold distance is four. FIG. 10A illustrates sequences of integers 910-919 that were created by block 330. In addition, FIG. 10B illustrates the appearance of reduced sequences of integers 920-922 (FIG. 9F) within sequences of integers 910-919. As shown, reduced sequence of integers 920 ("101 48 52") appears (within the exemplary second threshold distance of four) in eight out of the ten sequences of integers 910-919. Thus, a frequency of 80% is associated with reduced sequence of integers 920. For the same reason, a frequency of 80% is associated with reduced sequence of integers 921. Note, reduced sequences of integers 920 and 921 do not appear within the second threshold distance (of four, in this example) in sequence of integers 916, because the integers "101" and "48" are separated by more than four positions in group of network packets 916. Also as shown, reduced sequence of integers 922 ("53 101") appears (within the exemplary second threshold distance of four) in three out of the ten groups of network packets 910-919. Thus, a frequency of 30% is associated with reduced sequence of integers 922. The frequencies associated with reduced sequences of integers 920-921 are illustrated in FIG. 10B. These values, which indicate the frequencies with which reduced sequences of integers appear in order within a threshold distance in groups of network packets, may be referred to by the term "confidence values".

At block 360 (FIG. 3), reduced sequences of integers having confidence values below a threshold confidence value are discarded. In one embodiment, the threshold confidence value is between 80-90%. FIG. 10C illustrates the discarding of reduced sequence of integers 922. In addition, reduced sequences of integers 920 and 921 (which are the same) are de-duplicated and maintained as reduced sequence of integers 1030. For purposes of this disclosure, reduced sequence of integers 1030 may be referred to by the term "meta-expression".

Meta-expression 1030 represents the information that is sufficient to detect, via network traffic, the presence of a compromised computing system. Meta-expression 1030 is sufficient to detect a compromised computing system even if the computing system is compromised using a digital security threat than is different than the known threat that was provided as initial input to process 300 (FIG. 3). Recall that the input to process 300 (FIG. 3) was a series of network packets that were used to obtain meta-expressions, including: (i) normal communication between two computing systems before one of the computing systems becomes compromised, (ii) the introduction of a known threat that successfully compromises one of the computing systems, and (iii) communication involving the compromised computing system after the successful compromise, which contains characteristic emanations from the compromised computing system.

Process 300 (FIG. 3) may be repeated for other computing systems that run different operating systems and application services. For example, process 300 may be performed using network traffic that contains an attack based on threat A to expose an SSH vulnerability on a SOLARIS-based server, and be performed again using network traffic that contains an attack using threat B to expose a JAVA vulnerability on a WINDOWS-based computer. Indeed, process 300 may be repeated for different combinations of operating systems and application services in order to determine meta-expressions that can be used to detect later-arising compromises of different combinations of operating systems and application services.

Figure 11:
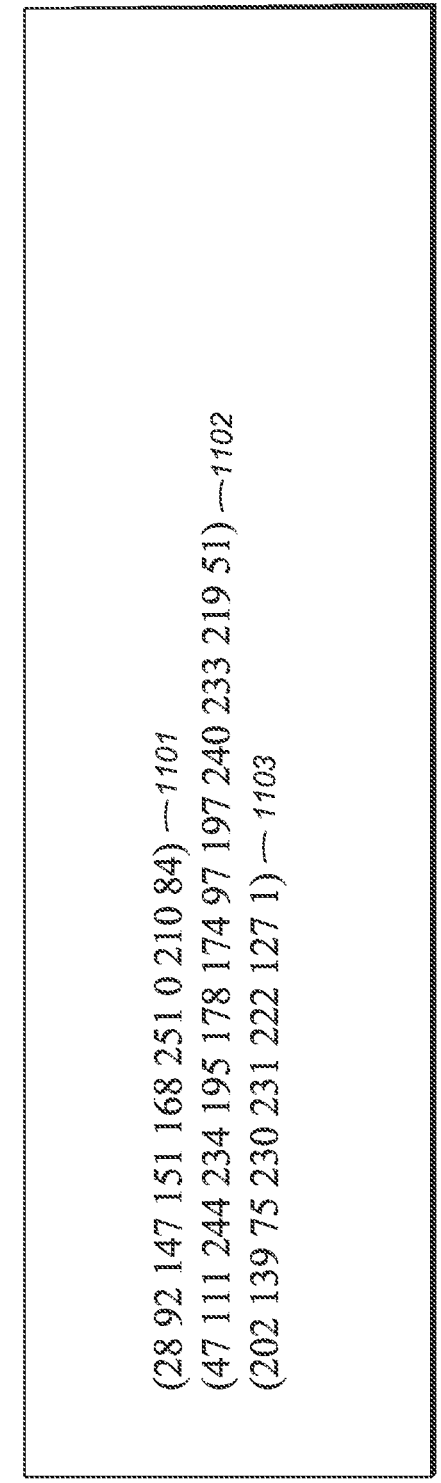
FIG. 11 depicts exemplary sequences of 8-bit integers.

FIG. 11 illustrates exemplary meta-expressions 1101-1103. Each of meta-expressions 1101-1102 can be used to detect the presence of a compromised computing system in a network. The structure and minimal size of these meta-expressions provide tremendous computational efficiencies as compared to conventional computer security technologies.

3. Run-Time

The efficiency with which compromised computing systems can be detected using the meta-expressions provided by process 300 is now discussed. Recall that process 300 (FIG. 3) is an exemplary UTMS training process that may be carried out by block 110 of FIG. 1. Thus, at the completion of process 300 (FIG. 3), processing proceeds to block 120 of FIG. 1.

At block 120, a UTMS utilizes meta-expressions to analyze network traffic, and to detect whether the network traffic contains characteristic emanations that indicate the presence of a compromised computing system in the network. For the sake of simplicity, a group of network packets is considered to be "normal" when it lacks characteristic emanations that indicate the presence of a compromised computing system. In contrast, a group of network packets is considered to be "abnormal" when it contains characteristic emanations that indicate the presence of a compromised computing system.

Processing at block 120 begins with the grouping of a series of bidirectional traffic between two network nodes. For this purpose, the techniques of block 310 (FIG. 3) may be used. Next, the groups of network packets are filtered for relevant information. For this purpose, the techniques of block 320 (FIG. 3) may be used. Next, the reassembled packets (containing relevant information), which form new groups of network traffic, are converted into sequences of integers. The bit size of the integers used during run-time should be the same as the bit size of the integers used during training. In one embodiment, the integers are 8-bits in size. For purposes of converting reassembled packets into sequences of integers, the techniques of block 330 (FIG. 3) may be used.

The sequences of integers produced by block 330 are compared against one or more meta-expressions to determine if the network traffic is normal or abnormal. A set of network traffic that is being analyzed is considered to be abnormal when two criteria are satisfied: (i) each integer in the meta-expression is present in the sequence of integers that corresponds to the network traffic, and (ii) each integer appears in the same order in both the corresponding sequence of integers and the meta-expression. Notably, a UTMS may conclude that a group of network packets lacks characteristic emanations (and is thus normal) at the first instance in which condition (i) fails to hold true, meaning that a UTMS need not always process an entire group of network packets in order to determine that the group of network packets is normal. This outcome is favorable because it lends itself to efficient UTMS operation, as compared to a design that iterates through every network packet in a group of network packets in order to determine if the group of network packets is normal. The failure of condition (ii), though still useful to determining whether a group of network packets is normal or abnormal, is less efficient because a sequence of integers may have multiple instances of a particular integer, and all of the instances must fail condition (ii) in order for condition (ii) to fail as a whole.

When an abnormal group of network packets is detected, the UTMS follows decision block 130 to block 140, where one or more appropriate responses are generated. When a group of network packets is determined to be normal, the UTMS returns to block 120 and analyzes additional network traffic. Blocks 120-130 are discussed with reference to FIG. 12. FIG. 12 illustrates exemplary groups of network packets 1200-1209 and exemplary meta-expression 1210. Meta-expression 1210 may be one of the meta-expressions that were created during training (block 110 of FIG. 1). The length of meta-expression 1210 is shortened for simplicity. As shown, groups of network packets 1201, 1202, and 1209 contain all of the integers of meta-expression 1210, in the same order in which the integers appear in meta-expression 1210. Thus, groups of network packets 1201, 1202, and 1209 are considered abnormal in that they contain characteristic emanations that indicate the presence of a compromised computing system. Groups of network packets 1200 and 1203-1208 do not contain all of the ordered integers of meta-expression 1210. Thus, groups of network packets 1200 and 1203-1208 are considered normal in that they lack characteristic emanations that indicate the presence of a compromised computing system.

As is evident from the preceding discussion, at block 120, a UTMS performs many integer comparisons. Thus, optimization of integer comparisons is important to the efficiency of the UTMS. Recall that a set of network traffic is considered normal at the first instance in which an integer in the meta-expression is absent in the sequence of integers that corresponds to the network traffic. Thus, the performance of the UTMS is improved if an early "normal" determination can be made. To this end, it is beneficial to structure the technique of block 120 such that the integer comparisons between a sequence of integers and a meta-expression terminate as soon as one integer from the meta-expression is identified as being absent in the sequence of integers.

In one embodiment, block 120 employs a nested computer programming language expression that returns an overall value of "failure" (e.g., a Boolean value) when any one of the nested levels returns a "false" condition. Thus, as soon as a UTMS identifies the absence of one integer (at any one of the nested levels), processing of the entire nested computer programming language expression terminates. The corresponding set of network traffic is thus identified as being normal (in which case, no additional threat detection is necessary), and a subsequent set of network traffic can be analyzed. For example, the LISP computer programming language allows for a nested expression in the form ((((A) (B)) (C)) (D)) that returns an overall value of "failure" if any one of expressions (A), (B), (C), and/or (D) is "false". In this example, the expression (A) may query whether the first integer in a meta-expression appears in a sequence of integers, and the expression (B) may query whether the second integer in the meta-expression appears in the sequence of integers, and so forth.

At block 140, one or more appropriate responses may be generated. One appropriate response may be a user or system alert that indicates the presence of a compromised computing system. The identity of the compromised computing system may be determined based on the group of network packets in which a characteristic emanation was found. Another appropriate response may be to scrub any network traffic from the source of the characteristic emanations, i.e., the compromised network node, such that the intruding network node cannot continue to receive responses from the compromised network node. Yet another appropriate response may be to cloak the compromised network node, so that the attacking network node can no longer reach the target network node and thus cannot continue the attack.

Figure 13:
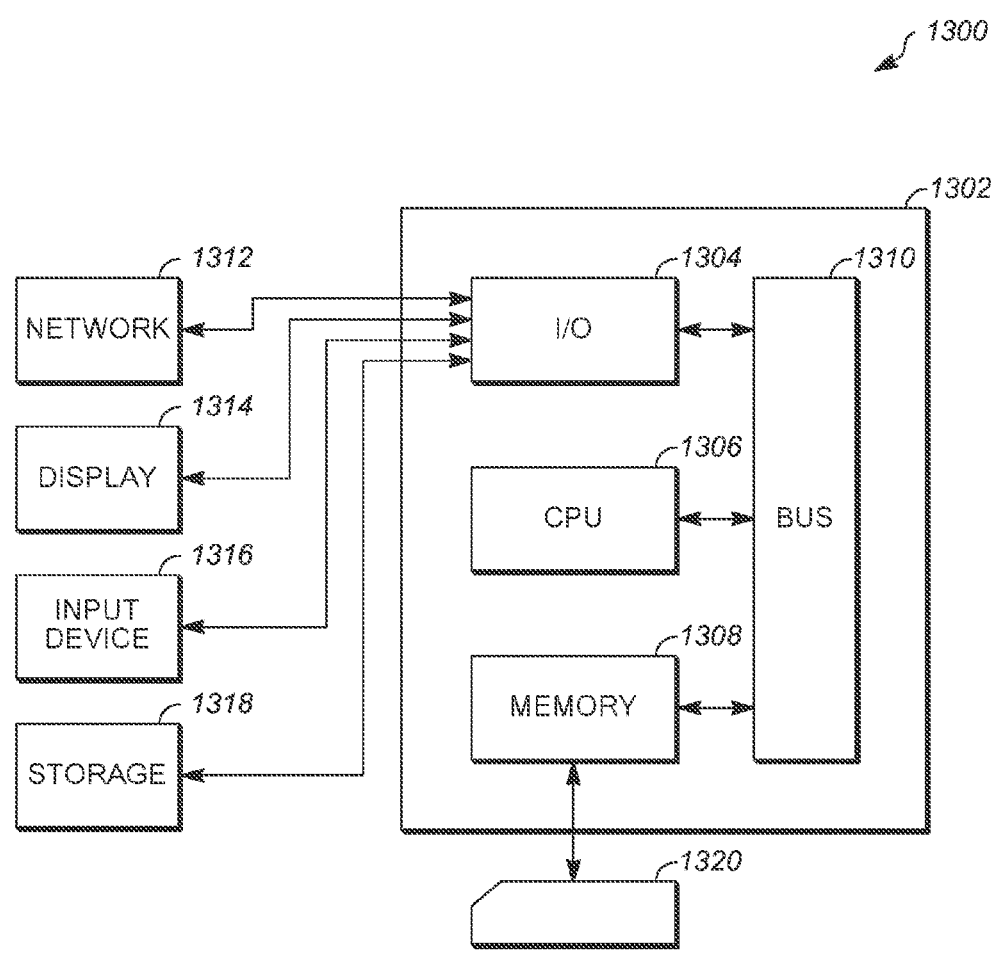
FIG. 13 depicts an exemplary computing system for detecting compromised computing systems.

Portions of process 100 (FIG. 1) may be implemented in exemplary computing system 1300 illustrated in FIG. 13. In some embodiments, computing system 1300 is a network device, such as a router, gateway, and firewall, or the like. In some embodiments, computing system 1300 is a gateway device, such as a modem, or the like. In some embodiments, computing system 1300 is a mobile device, such as a desktop computer, a laptop computer, a cellular phone, a tablet, or the like. In some embodiments, computing system 1300 is a network interface "card". Notably, the training aspects of process 100 (i.e., block 110) and the run-time aspects of process 100 (i.e., blocks 120-140) may be implemented onto the same, or onto different computing systems.

As shown in FIG. 13, the computing system 1300 includes a computer motherboard 1302 with bus 1310 that connects I/O section 1304, one or more central processing units (CPU) 1306, and a memory section 1308 together. Memory section 1308 may have memory module 1320 related to it. Memory module 1320 may be, for example, a flash memory and/or a removable memory device. The I/O section 1304 is connected to network interface 1312, which receives and/or transmits network packets. I/O section 1304 may be connected to display 1314, input device 1316, and/or storage unit 1318. Memory section 1308, memory module 1320, and/or storage unit 1318 can store (e.g., tangibly embody) computer-readable medium that contain computer-executable instructions and/or data for performing any one of the above-described processes using CPU 1306. The computer-executable instructions may be written, for example, in a general-purpose programming language (e.g., LISP, C) or some specialized application-specific language. Input device 1316 may be a USB port supporting input from USB-compliant devices, such as a keyboard, a mouse, a memory stick, or the like. At least some values based on the results of the above-described processes can be saved into memory such as memory 1308, memory module 1320, and/or disk storage unit 1318 for subsequent use.

Portions of process 100 (FIG. 1) also may be implemented into a processor by way of specifically arranged integrated circuits (e.g., application-specific integrated circuits). In some embodiments, the integrated circuit can be part of the main processor of a device, such as the main processor of a cellular phone. In some embodiments, the integrated circuit can be part of an auxiliary processor of a device, such as a processor that is connected to the motherboard of a laptop. The integrated circuits can contain computer-executable instructions and/or data for performing any one of the above-described processes. The computer-executable instructions may be written, for example, in a specialized application-specific (e.g., processor-specific) language.

In some embodiments, computer-executable instructions based on the C programming language that total less than 1 MB are sufficient to carry out process 100 (FIG. 1). Execution of these computer-executable instructions requires no more than 300 kilobytes (16-bit bytes) of run-time memory (e.g., random access memory). Modern computing systems and/or processors are well-capable of processing computer-executable instructions of these sizes. Indeed, in these embodiments, network interface bandwidth (i.e., input bandwidth), not processor speed, is typically the gating factor to processing even higher volumes of network traffic.

In some embodiments, one or more portions of process 100 (FIG. 1) may be implemented together with a digital security threat detector, such as the network activities of interest detector described in U.S. Pat. No. 8,347,391, which is also owned by Applicants. Portions of U.S. Pat. No. 8,347,391 directed to the creation and use of meta-expressions for detecting network activities of interest, such as computer viruses, are hereby incorporated by reference for all purposes. The implementation of process 100 with a digital security threat detector is beneficial because a threat that avoids detection by the digital security threat detector (and therefore successfully compromises a computing system) can be later addressed using one or more portions of process 100.

Although only certain exemplary embodiments have been described in detail above, those skilled in the art will readily appreciate that many modifications are possible in the exemplary embodiments without materially departing from the novel teachings and advantages of this disclosure. Aspects of embodiments disclosed above can be combined in other combinations to form additional embodiments. All such modifications are intended to be included within the scope of this technology.

For instance, in some embodiments, the above-described techniques may be modified to detect a compromised computing system that is not networked. More specifically, a non-networked computing system may still produce characteristic emanations, in the form of memory data, when one of its services becomes compromised. The above-described techniques may thus be adapted to use memory dumps, instead of captured network packets, in determining meta-expressions and in identifying system compromises using meta-expressions. The determining of meta-expressions and/or the monitoring of memory contents using meta-expressions can be performed by software and/or hardware on the local, non-networked computing system.

What is claimed is:

1. A computer-implemented method for detecting a computing device that is compromised by an undetected attack, the method comprising:
   obtaining, by one or more processors, a plurality of network packets from a network, wherein the obtained plurality of network packets include:
      network packets containing a known attack on the computing device, the known attack different from the undetected attack,
      network packets from the computing device before the known attack, and
      network packets from the computing device after the known attack;
   creating, by the one or more processors, a plurality of combined packets from one or more of the plurality of network packets, wherein the plurality of combined packets includes a first combined packet and a second combined packet, and wherein the second combined packet is different from the first combined packet;
   creating, by the one or more processors, a first sequence by converting bitwise content of at least a portion of the first combined packet into a first plurality of integers, wherein the first sequence includes the first plurality of integers;
   creating, by the one or more processors, a second sequence by converting bitwise content of at least a portion of the second combined packet into a second plurality of integers, wherein the second sequence includes the second plurality of integers;
   determining, by the one or more processors, a similarity metric between the first sequence and the second sequence based on a distance function;
   creating, by the one or more processors, a third sequence based on the similarity metric,
      wherein the third sequence comprises a third plurality of integers common to the first sequence and the second sequence, in the first order, and wherein the third sequence is a meta-expression indicative of a compromised computing device; and storing the meta-expression, wherein the stored meta-expression is used to detect that the computing device is compromised by the undetected attack.

2. The computer-implemented method of claim 1, wherein:

the undetected attack targets a vulnerability in the computing device, the vulnerability unknown to the one or more processors.

3. The computer-implemented method of claim 1, wherein the creating of the first combined packet comprises:

identifying a first network packet, of the plurality of network packets, representing a request;

identifying a second network packet, of the plurality of network packets, representing an acknowledgement, wherein the second network packet:

occurs after the first network packet, and represents an acknowledgement corresponding to the first network packet; and identifying a third network packet of the plurality of network packets, wherein the third network packet occurs between the first network packet and the second network packet.

4. The computer-implemented method of claim 1, wherein:

the similarity metric represents a difference between a position of an integer in the first sequence and a position of the integer in the second sequence, and the integer is included in the third sequence if the difference is within a first pre-determined distance.

5. The computer-implemented method of claim 4, wherein:

the first predetermined distance is four.

6. The computer-implemented method of claim 1, wherein:

the integers of the third sequence appear, in the first order, in at least a predetermined frequency among the plurality of combined packets, wherein the frequency is between 80-90%, inclusive.

7. The computer-implemented method of claim 1, wherein:

the first, second, and third plurality of integers are 8-bit integers.

8. The computer-implemented method of claim 7, wherein:

the converting bitwise content of the at least a portion of the first combined packets into the first plurality of integers comprises grouping the bitwise content of the at least a portion of the first combined packet into 8-bit integers.

9. The computer-implemented method of claim 1, wherein the computing device is a first computing device, wherein the one or more processors are processors of a second computing device, wherein the stored meta-expression is stored on the second computing device, and the method further comprises:

detecting, by the one or more processors of the second computing device, the compromised condition of the first computing device.

10. The computer-implemented method of claim 1, wherein the computing device is a first computing device, wherein the one or more processors are processors of a second computing device, wherein the stored meta-expression is stored on the second computing device, and the method further comprises:

transmitting, from the second computing device to a third computing device, the stored meta-expression, wherein the second computing device is different from the third computing device;

storing, by the third computing device, the transmitted meta-expression; and detecting, by the third computing device, the compromised condition of the first computing device.

11. The computer-implemented method of claim 1, wherein the plurality of network packets is a first plurality of network packets, the method further comprising:

a) obtaining, by the one or more processors, a second plurality of network packets from the network, wherein the obtained second plurality of network packets include transmission from the computing device;

b) creating, by the one or more processors, the second combined packet from one or more of the second plurality of network packets obtained in a);

c) obtaining the meta-expression;

d) determining whether the meta-expression obtained in c) appears in the second combined packet created in b);

e) if the meta-expression obtained in c) appears in the second combined packet created in b), then initiating an operation.

12. The computer-implemented method of claim 11, wherein the determining comprises:

determining whether the third plurality of integers, which are ordered, of the meta-expression obtained in c) appear in the second combined packet created in b) in the same order.

13. The computer-implemented method of claim 11, wherein the operation includes filtering a network packet.

14. The computer-implemented method of claim 11, wherein the operation includes cloaking the computing device.

15. The computer-implemented method of claim 11, wherein the creating of the second combined packet comprises:

identifying a first network packet representing a request;

identifying a second network packet representing an acknowledgement, wherein the second network packet:

occurs after the first network packet, and represents an acknowledgement corresponding to the first network packet; and identifying a third network packet wherein the third network packet occurs between the first network packet and the second network packet.

16. A networking device for detecting a networked computing device that is compromised by an undetected attack, comprising:

a network port for connecting to a network infrastructure, wherein the network port is adapted to obtain a plurality of network packets, wherein the obtained plurality of network packets include:

network packets containing a known attack on the computing device, the known attack different from the undetected attack, network packets from the computing device before the known attack, and network packets from the computing device after the known attack;

a processor connected to the network port, wherein the processor is adapted to:

create a plurality of combined packets, from one or more of the plurality of network packets, wherein the plurality of combined packets includes a first combined packet and a second combined packet, and wherein the second combined packet is different from the first combined packet;

create a first sequence by converting bitwise content of at least a portion of the first combined packet into a first plurality of integers, wherein the first sequence includes the first plurality of integers;

create a second sequence by converting bitwise content of at least a portion of the second combined packet into a second plurality of integers, wherein the second sequence includes the second plurality of integers;

determine a similarity metric between the first sequence and the second sequence based on a distance function;

create a third sequence based on the similarity metric, wherein the third sequence comprises a third plurality of integers common to the first sequence and the second sequence, in the first order, and wherein the third sequence is a meta-expression indicative of a compromised computing device; and a memory connected to the processor, wherein the memory is adapted to store the meta-expression, wherein the stored meta-expression is used to detect that the computing device is compromised by the undetected attack.

17. The networking device of claim 16, wherein:
the undetected attack targets a vulnerability in the computing device, the vulnerability unknown to the networking device.

18. The networking device of claim 16, wherein the creating of the first combined packet comprises:
identifying a first network packet, of the plurality of network packets, representing a request;
identifying a second network packet, of the plurality of network packets, representing an acknowledgement, wherein the second network packet:
occurs after the first network packet, and
represents an acknowledgement corresponding to the first network packet; and
identifying a third network packet of the plurality of network packets, wherein the third network packet occurs between the first network packet and the second network packet.

19. The networking device of claim 16, wherein:
the similarity metric represents a difference between a position of an integer in the first sequence and a position of the integer in the second sequence, and
the integer is included in the third sequence if the difference is within a first pre-determined distance.

20. The networking device of claim 19, wherein:
the first predetermined distance is four.

21. The networking device of claim 16, wherein:
the integers of the third sequence appear, in the first order, in at least a predetermined frequency among the plurality of combined packets, and wherein the frequency is between 80-90%, inclusive.

22. The networking device of claim 21, wherein:
the first, second, and third plurality of integers are 8-bit integers.

23. The networking device of claim 16, wherein:
the converting bitwise content of the at least a portion of the first combined packets into the first plurality of integers comprises grouping the bitwise content of the at least a portion of the first combined packet into 8-bit integers.

24. The networking device of claim 16, wherein the processor is further adapted to:
detect the compromised condition of the computing device.

25. The networking device of claim 16,
wherein the computing device is a first computing device, wherein the processor is further adapted to:
transmit, to a second computing device, the stored meta-expression,
wherein the transmitted meta-expression is stored by the second computing device, and
wherein the transmitted meta-expression is used by the second computing device to detect the compromised condition of the first computing device.

26. The networking device of claim 16, wherein the plurality of network packets is a first plurality of network packets, and wherein the processor is further adapted to:
a) obtain a second plurality of network packets from the network, wherein the obtained second plurality of network packets include transmission from the computing device;
b) create the second combined packet from one or more of the second plurality of network packets obtained in a);
c) obtain the meta-expression;
d) determine whether the meta-expression obtained in c) appears in the second combined packet created in b);
e) if the meta-expression obtained in c) appears in the second combined packet created in b), then initiate an operation.

27. The networking device of claim 26, wherein the determining comprises:
determining whether the third plurality of integers, which are ordered, of the meta-expression obtained in c) appear in the second combined packet created in b) in the same order.

28. The networking device of claim 26, wherein the operation includes filtering a network packet.

29. The networking device of claim 26, wherein the operation includes cloaking the computing device.

30. The networking device of claim 26, wherein the creating of the second combined packet comprises:
identifying a first network packet representing a request;
identifying a second network packet representing an acknowledgement, wherein the second network packet:
occurs after the first network packet, and
represents an acknowledgement corresponding to the first network packet; and
identifying a third network packet wherein the third network packet occurs between the first network packet and the second network packet.

31. A non-transitory computer-readable storage medium having computer-executable instructions for detecting a computing device that is compromised by an undetected attack, the computer-executable instructions, when executed by one or more processors, cause the one or more processors to perform the acts of:
obtaining a plurality of network packets from a network, wherein the obtained plurality of network packets include:
network packets containing a known attack on the computing device, the known attack different from the undetected attack, network packets from the computing device before the known attack, and
network packets from the computing device after the known attack;
creating a plurality of combined packets from one or more of the plurality of network packets, wherein the plurality of combined packets includes a first combined packet and a second combined packet, and wherein the second combined packet is different from the first combined packet;
creating, by the one or more processors, a first sequence by converting bitwise content of at least a portion of the first combined packet into a first plurality of integers, wherein the first sequence includes the first plurality of integers;
creating, by the one or more processors, a second sequence by converting bitwise content of at least a portion of the second combined packet into a second plurality of integers, wherein the second sequence includes the second plurality of integers;
determining a similarity metric between the first sequence and the second sequence based on a distance function;
creating a third sequence based on the similarity metric, wherein the third sequence comprises a third plurality of integers common to the first sequence and the second sequence, in the first order, and
wherein the third sequence is a meta-expression indicative of a compromised computing device; and
storing the meta-expression, wherein the stored meta-expression is used to detect that the computing device is compromised by the undetected attack.

32. The non-transitory computer-readable storage medium of claim 31,
wherein the undetected attack targets a vulnerability in the computing device, and
wherein the vulnerability is unknown to the one or more processors.

33. The non-transitory computer-readable storage medium of claim 31, wherein the creating of the first combined packet comprises:
identifying a first network packet, of the plurality of network packets, representing a request;
identifying a second network packet, of the plurality of network packets, representing an acknowledgement, wherein the second network packet:
occurs after the first network packet, and
represents an acknowledgement corresponding to the first network packet; and
identifying a third network packet of the plurality of network packets, wherein the third network packet occurs between the first network packet and the second network packet.

34. The non-transitory computer-readable storage medium of claim 31, wherein:
the similarity metric represents a difference between a position of an integer in the first sequence and a position of the integer in the second sequence, and
the integer is included in the third sequence if the difference is within a first pre-determined distance.

35. The non-transitory computer-readable storage medium of claim 34, wherein:
the first predetermined distance is four.

36. The non-transitory computer-readable storage medium of claim 31, wherein:
the integers of the third sequence appear, in the first order, in at least a predetermined frequency among the plurality of combined packets, and wherein the frequency is between 80-90%, inclusive.

37. The non-transitory computer-readable storage medium of claim 31, wherein:
the first, second, and third plurality of integers are 8-bit integers.

38. The non-transitory computer-readable storage medium of claim 37, wherein:
the converting bitwise content of the at least a portion of the first combined packets into the first plurality of integers comprises grouping the bitwise content of the at least a portion of the first combined packet into 8-bit integers.

39. The non-transitory computer-readable storage medium of claim 31,
wherein the computing device is a first computing device,
wherein the stored meta-expression is stored on a second computing device, and
wherein the computer-executable instructions comprises instructions for:
detecting, by the second computing device, the compromised condition of the first computing device.

40. The non-transitory computer-readable storage medium of claim 31,
wherein the computing device is a first computing device,
wherein the stored meta-expression is stored on a second computing device, and
wherein the computer-executable instructions comprises instructions for:
transmitting, from the second computing device to a third computing device, the stored meta-expression,
wherein the second computing device is different from the third computing device,
wherein the transmitted meta-expression is stored by the third computing device, and
wherein the transmitted meta-expression is used by the third computing device to detect the compromised condition of the first computing device.

41. The non-transitory computer-readable storage medium of claim 31, wherein the plurality of network packets is a first plurality of network packets, and wherein the computer-executable instructions comprise instructions for:
a) obtaining a second plurality of network packets from the network, wherein the obtained second plurality of network packets include transmission from the computing device;
b) creating the second combined packet from one or more of the second plurality of network packets obtained in a);
c) obtaining the meta-expression;
d) determining whether the meta-expression obtained in c) appears in the second combined packet created in b);
e) if the meta-expression obtained in c) appears in the second combined packet created in b), then initiating an operation.

42. The non-transitory computer-readable storage medium of claim 41, wherein the determining comprises:
determining whether the third plurality of integers, which are ordered, of the meta-expression obtained in c) appear in the second combined packet created in b) in the same order.

43. The non-transitory computer-readable storage medium of claim 41, wherein the operation includes filtering a network packet.

44. The non-transitory computer-readable storage medium of claim 41, wherein the operation includes cloaking the computing device.

45. The non-transitory computer-readable storage medium of claim 41, wherein the creating of the second combined packet comprises:
- identifying a first network packet representing a request;
- identifying a second network packet representing an acknowledgement, wherein the second network packet:
  - occurs after the first network packet, and
  - represents an acknowledgement corresponding to the first network packet; and
- identifying a third network packet wherein the third network packet occurs between the first network packet and the second network packet.

\* \* \* \* \*